_United States Patent Office_ 3,419,080
Patented Dec. 31, 1968

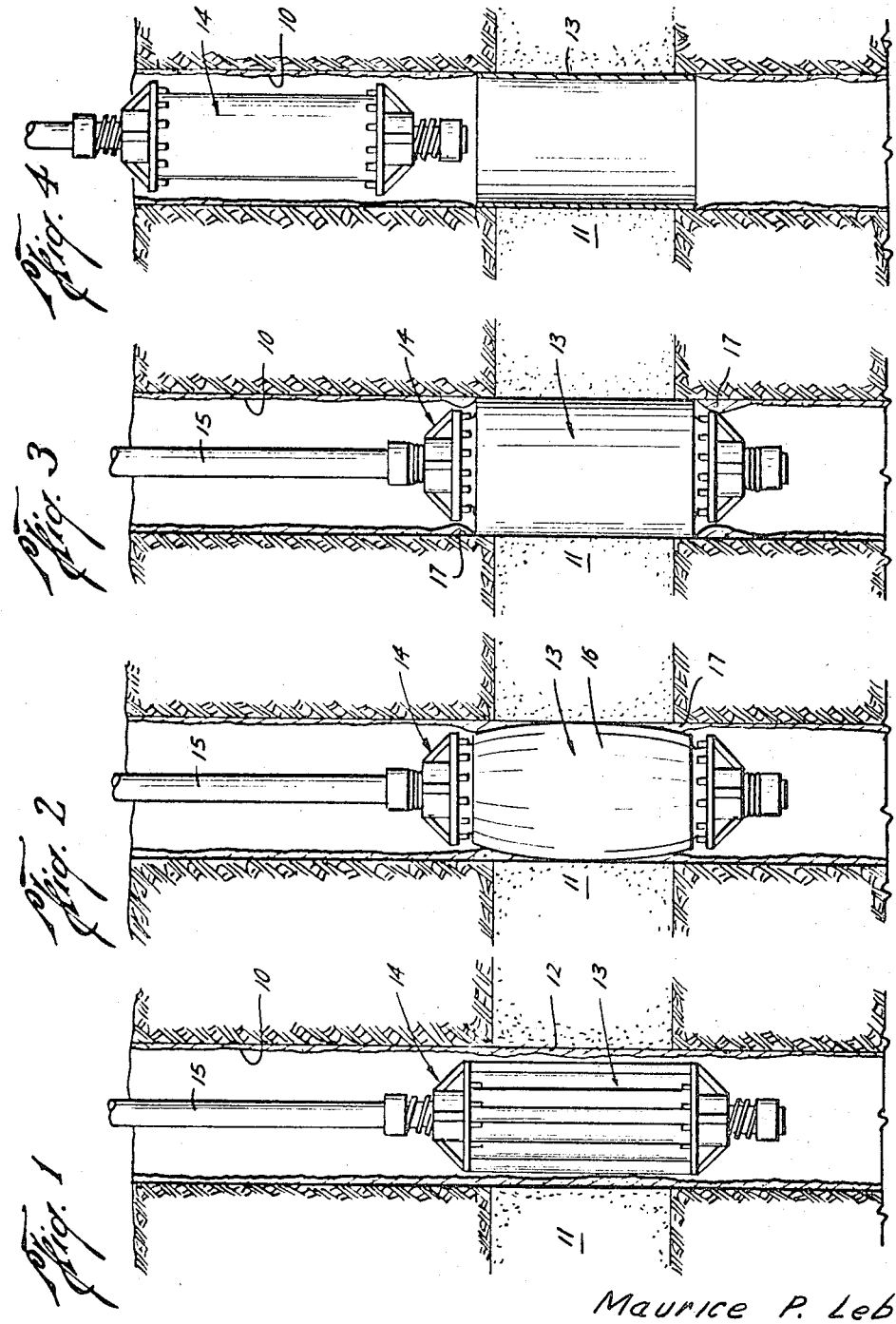

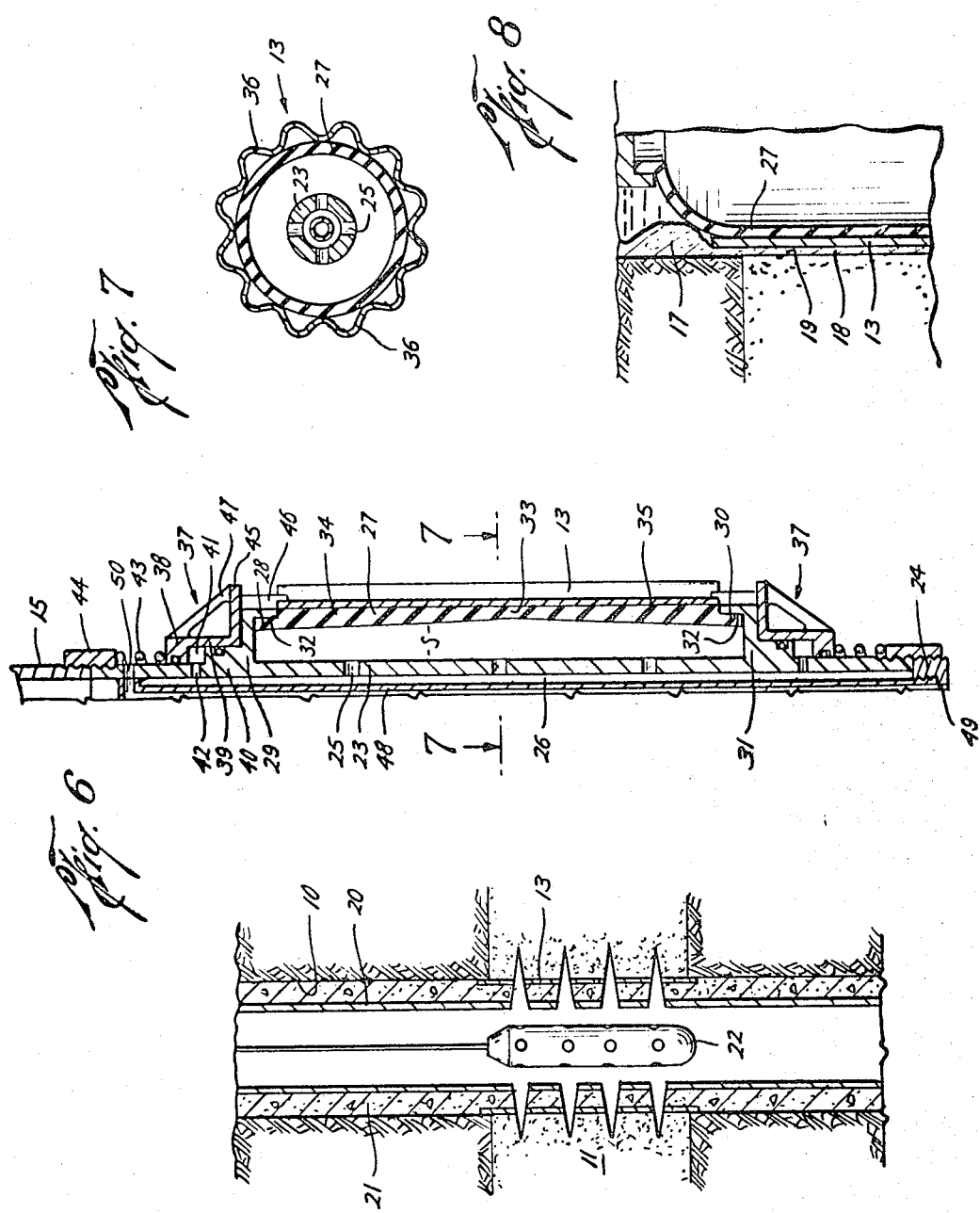

3,419,080
ZONE PROTECTION APPARATUS
Maurice P. Lebourg, Houston, Tex., assignor to Schlumberger Technology Corporation, Houston, Tex., a corporation of Texas
Original application Oct. 23, 1965, Ser. No. 503,471, now Patent No. 3,389,752, dated June 25, 1968. Divided and this application Sept. 8, 1967, Ser. No. 680,594
4 Claims. (Cl. 166—207)

ABSTRACT OF THE DISCLOSURE

One embodiment of an apparatus which is illustrative of the present invention includes a body member carrying an inflatable elastomer sleeve and an impermeable expansible liner which surrounds said sleeve and which is attached on said body member by hydraulically movable devices. In response to fluid pressure, said devices can be released from engagement with said liner whereupon inflation of said sleeve will effect expansion of said liner into sealing contact with the well bore wall.

---

This is a division of application Ser. No. 503,471, filed Oct. 23, 1965, now Patent No. 3,389,752.

This invention relates generally to oilwell completion methods and, more particularly, to the utilization of liners in a well bore to seal and thereby protect a formation zone from the adverse effects of cementing operations.

It is generally known that certain types of commercially interesting oil-bearing formations are damaged and their ability to satisfactorily produce seriously impaired by cementing operations conducted during completion of the well. For example, low pressure, highly permeable or fractured zones are easily damaged by cement solids or may be contaminated by filtrate. Reef or carbonate formations of vugular or fractured types are adversely affected by penetration of cement solids into the voids. Some formations contain water sensitive components that swell, expand or disintegrate when in contact with cement slurry filtrate, resulting in decreased permeability. When the aforementioned formation damage occurs the formation fails to produce as anticipated based on such productivity indicators as drillstem test data. Expensive and time-consuming re-perforating or other stimulation is then required before satisfactory completion can be attained. In some cases, the zone may have to be abandoned.

It is therefore an object of this invention to provide a new and improved apparatus for use in completing a well wherein selected formation zones are protected from damage due to cementing operations.

A further object of the invention is to provide a new and improved apparatus for use in preventing formation damage during cementing operations, the apparatus being simple and effective to afford overall coat savings in oil recovery operations.

With these and other objects in mind, the present invention includes a body member which can be lowered to a point adjacent an impermeable zone in a well bore. The body member carries an inflatable sleeve and an impermeable liner surrounding the sleeve. Hydraulically operable means are slidably disposed on the body member and serve to releasably attach the liner on the body member. Upon the application of fluid pressure, the hydraulically operable means releases the liner, whereupon expansion of the sleeve causes the liner to be formed into intimate contact with the surrounding well bore wall to seal off the formation zone from fluids and filtrate in the well bore.

The novel features of the present invention are set forth with particularity in the appended claims. The invention, together with the further objects and advantages thereof may best be understood by way of illustration and example when taken in conjunction with the accompanying drawings in which:

FIG. 1 is a sectional view of the well bore showing an expandable seal and setting tool therefor positioned adjacent the formation to be protected from cement damage;

FIG. 2 is a sectional view of the well bore showing the initial setting phase of the expandable seal;

FIG. 3 is a sectional view of the well bore showing the final setting phase and wherein the setting tool of the invention is fully inflated and the expandable seal in place against the formation wall;

FIG. 4 is a sectional view of the well bore showing the setting tool deflated and being withdrawn from the well and the expandable seal remaining in place;

FIG. 5 is a sectional view of the well bore showing casing cemented therein with the expandable seal protecting the adjacent formation from cement damage;

FIG. 6 is an elevational half-sectional view of one embodiment of apparatus for practicing the method of the present invention, the section taken on line 6—6 of FIG. 1;

FIG. 7 is a section on line 7—7 in FIG. 6; and

FIG. 8 is an enlarged fragmentary sectional view of the expandable seal adjacent the zone wall.

With reference to FIG. 1, numeral 10 indicates a well bore extending downwardly through a permeable formation zone 11 which is to be protected from cement damage. The well bore contains the usual column of drilling mud for control of formation pressures and numeral 12 indicates the filter or "mud" cake which is deposited on the walls of permeable formation zone 11. Means for sealing the formation zone 11, in the form of an expandable liner 13 made of an impermeable, yet elastic and flexible material, is attached to an inflatable setting tool 14, the combination inflatable setting tool and expandable liner being suspended in the well bore on a tubular running-in string 15.

Turning now to FIG. 2, liner 13 is shown being expanded out into sealing engagement with the walls of the formation zone 11 by the introduction of pressure into the inflatable setting tool 14 through the running-in string 15. To effectively seal the formation, the setting tool, to be more fully described below, is so designed that as pressure is increased therein the circumferential mid-portion 16 of liner 13 is the first portion of the liner to contact the filter cake on the zone wall. As setting of the liner continues, it is progressively pressed out against the filter cake from the mid-portion of the liner toward either end. As shown generally in FIG. 3 and in more detail in FIG. 8, a movable portion 17 of the filter cake is displaced or squeezed out from behind the liner so that the liner is forced into firm contact with the portion 18 of the filter cake remaining between the liner 13 and formation zone wall 19. In this manner the entire peripheral area of the liner is placed adjacent the zone wall 19 to effect a seal.

Due to the differential pressure between the mud column and the formation fluid, the impermeable liner 13 will stick adjacent the wall of formation zone 11 due to the hydraulic phenomena generally denoted as "differential sticking" and discussed in "Mechanics of Differential Pressure Sticking of Drill Collars," H. D. Outmans, 1958 Journal of Petroleum Technology, vol. 213, p. 265. Briefly described, the mechanics of the sticking are such that when the liner is forced into contact with the filter cake, the flow of filtrate from the drilling mud in the well bore 10 into the isolated area behind the liner 13 is shut off. Filtrate in the cake will continue to flow into the formation, but since no filtrate can enter the cake, its water content decreases. Decrease in water content in the isolated part of the cake is accompanied by a reduction in porosity and hence in volume. In other words, the cake between the liner 13 and the formation wall 19 shrinks as the water is squeezed out of the cake into the formation. As the water content decreases the hydraulic stresses throughout the cake decreases until they become substantially equal to the formation fluid pressure. When this action has occurred, the pressure differential between the mud column pressure and the formation fluid pressure will act radially outwardly across the entire peripheral area of the impermeable liner 13 to hold the liner in firm sealing engagement over the zone wall 19 without the need for an anchoring device thereby protecting the formation zone from invasion to cement slurry or filtrate.

Furthermore, as the filter cake shrinks, the diameter of the liner 13 increases and the mud column pressure acts over an increasingly greater peripheral area of the liner. Thus, the liner 13 becomes increasingly more stuck adjacent the formation zone wall and greater forces will be required to dislodge the liner therefrom. As shown in FIG. 4, setting tool 14 is deflated by bleeding off pressure therein through running-in string 15. After deflation, the setting tool is withdrawn, leaving liner 13 in place.

With the formation thus sealed and protected, casing 20 can now be run through the sealed zone and cement slurry displaced down through the casing and up through the annular space between the casing and the sealed zone. As shown in FIG. 5, flow of connate fluids from formation 11 into the casing 20 is established by perforating through casing 20, cement 21, liner 13 and into the sealed zone by a perforator 22 in a well-known manner.

Apparatus suitable to perform the method is shown in FIG. 6. Inflatable setting tool 14 has a central body including a mandrel 23 which is threadedly coupled at its upper end to running-in string 15 and closed at its lower end by a plug 24. A plurality of ports 25 extend through the mandrel wall and provide communication between the bore 26 of the mandrel and the annular space S enclosed by a sleeve or bladder 27 made of rubber or other elastomeric material. The sleeve 27 is attached to mandrel 23 at an upper end 28 by cap member 29 and at a lower end 30 by cap member 31, the joints 32 between the ends of the sleeve and the caps being hermetically sealed in a suitable manner. The wall thickness of sleeve 27 increases gradually from the thinnest portion 33 at its mid-portion to thicker portions 34, 35 near each end, thereby permitting control of the progress of inflation of the sleeve.

A tube 48 is provided for by-passing fluids through the inflatable setting tool 14 as it is being shifted longitudinally through the fluid-filled well bore. The tube 48 communicates with a port 49 in the plug 24 and extends upwardly through mandrel 23 to a second port 50 above the upper cap member 29, thereby placing the spaces above and below the setting tool 14 in communication.

Attached to the exterior of setting tool 14 is the expandable seal or liner 13 made of a flexible yet impermeable material such as a cylindrical sheath of a soft steel or other metal having approximately a 1/16" wall thickness. Alternatively, a cylindrical sheath of a suitable plastic can be used. The inside surface of the liner may be suitably prepared for optimum bonding to cement by sandblasting or the like. To reduce the outside diameter of liner 13 so that it may be expeditiously run into the well bore, longitudinal folds or corrugations 36 may be made therein as shown in FIG. 7.

Upper and lower means 37 for releasably attaching the liner 13 to the exterior of setting tool 14 are provided. Both means being identical in construction, only the upper means will be described. An annular sleeve piston 38 is slidably disposed about mandrel 23. Piston 38 is secured to a tubular skirt 39 which extends slidably over the exterior of head 40 above cap member 29. The length of skirt 39 is such as to provide a sealed expansible pressure chamber 41 between the upper end of head 40 and piston 38. Ports 42 extend through the wall of mandrel 23 and provide communication between the interior of the mandrel and pressure chamber 41. Alternatively, vertical ports (not shown) may be provided through the cap member and head to place chamber 41 in communication with the space S between the sleeve and mandrel. A helical compression spring 43 is disposed around mandrel 23 between the top of piston 38 and tubing collar 44. Extending outwardly from the lower end of skirt 39 is an annular flange 45 having an outside diameter at least as great as the reduced diameter of liner 13 so that any obstructions met while lowering the apparatus into the well bore will not act to dislodge the liner from the setting tool. Depending downwardly from flange 45 are a plurality of notched retaining fingers 46 which engage the ends of liner 13 and securely hold it in place on the setting tool. Brace members 47 may be provided to aid in passing borehole obstructions.

In operation, the structural organization of parts shown in FIG. 6 is lowered into well bore 10 and positioned adjacent the formation to be protected 11. A suitable pressure medium is introduced down through running-in string 15 and passes through ports 25 into the space S, thus acting to expand sleeve 27. It will be appreciated, of course, that the apparatus could be run on a wireline and a downhole pump used to inflate the sleeve.

As mentioned above, due to variation in cross-sectional thickness of sleeve 27, expansion will begin at mid-portion 33 and progress toward each end. The mid-portion of expandable seal or liner 13 will therefore be the first portion to engage the filter cake 12 on the formation wall and sleeve 27 will act to apply the liner from its midportion toward both ends. This mode of applying the liner, as previously explained, will act to displace a movable portion of the filter cake from behind the liner and expedite the forming of a good seal.

The aforementioned pressure, transmitted via ports 42, moves pistons 38 against springs 43 to disengage the notched fingers 46 from the ends of the liner 13. This releases the liner from the setting tool for applying the liner to the formation wall. Continued application of pressure to setting tool 14 will fully inflate sleeve 27 and firmly press the entire outer surface of liner 13 into sealing engagement adjacent the formation zone wall 19.

Setting tool 14 is deflated for removal by bleeding off pressure from within sleeve 27 through running-in string 15. The elastomeric sleeve member 27 will return to its normal, unstretched size and the setting tool can be withdrawn from the well.

In use of the present invention, after the well is drilled and before casing is run and cemented, the inflatable setting tool and an expandable liner are lowered into the well bore until the liner is adjacent a selected hydrocarbon-bearing formation susceptible to damage by cementing operations. The setting tool is then actuated to expand the liner out against, and into sealing engagement with, the formation wall. Controlled expansion of the liner acts to displace a movable portion of the filter cake on the formation wall so that an effective seal is made by the liner. When the liner comes into contact with the filter cake, the filtrate flow is shut off and differential sticking is permitted as heretofore described. If desired, the setting tool is maintained in its fully inflated condition for a period of time to insure stabilization of filter cake fluid pressure and formation fluid pressures behind the liner.

The setting tool is then deflated and withdrawn from the well bore, leaving the liner in place. The pressure differential between hydrostatic mud column fluid pressure and formation fluid pressure acts to hold the impermeable liner in place and effectively seal the formation zone. Casing may now be run through the zone and cemented in place, the liner preventing contact between the cement slurry and the formation and thereby protecting the formation from cement damage. To complete the well, perforations may be made through the casing, cement and liner so that flow of connate fluids from the formation into the casing is permitted.

It will be readily seen that a new and improved apparatus for use in completing a well has been disclosed wherein formation zones can be protected from damage during cementing operations. The invention is simple and effective and will afford overall cost savings in oil recovery operations by eliminating the need for remedial work to attain satisfactory production from formation zones which have sustained cement damage. Since certain changes may be made without departing from the scope of the inventive concept involved, it is intended that all matter contained in the above description or shown in the accompanying drawings shall be interpreted as illustrative and not in a limiting sense.

What is claimed is:

1. Apparatus for use in a well bore comprising: a hollow body, an inflatable elastomer sleeve about said body; means providing communication between the interior of said hollow body and the interior of said elastomer sleeve so that pressure applied to said body will act to inflate said elastomer sleeve; an impermeable expandable liner releasably attached to said body and positioned to surround said sleeve; and hydraulically operable means engaging the ends of said liner for attaching said liner on said body, said hydraulically operable means being slidably disposed on said body and operable in response to pressure within said body for releasing said liner from attachment to said body.

2. Apparatus as recited in claim 1, wherein the expandable liner has longitudinal corrugations initially formed therein to reduce the outer diameter thereof.

3. Apparatus as recited in claim 1, wherein said hydraulically operable means includes a piston and skirt forming an expansible chamber; and fingers initially engaging said liner and movable with said piston.

4. Apparatus as recited in claim 1, and further comprising a means on said body for placing the space above and below the sleeve in communication.

References Cited

UNITED STATES PATENTS

| | | | |
|---|---|---|---|
| 2,583,316 | 1/1952 | Bannister | 166—207 X |
| 2,796,134 | 6/1957 | Binkley | 166—207 |
| 2,812,025 | 11/1957 | Teague et al. | 166—207 |
| 3,047,065 | 7/1962 | Vincent | 166—14 |
| 3,111,991 | 11/1963 | O'Neal | 166—207 |
| 3,134,442 | 5/1964 | Jennings | 166—207 |
| 3,326,293 | 6/1967 | Skipper | 166—14 X |

DAVID H. BROWN, *Primary Examiner.*